Jan. 24, 1961   R. E. RAYMOND   2,969,084
PRESSURE RESPONSIVE VALVE
Filed April 21, 1958

Inventor
Robert E. Raymond
By Schraeder, Hofgren,
Brady & Wegner
Attorneys

United States Patent Office 2,969,084
Patented Jan. 24, 1961

2,969,084
PRESSURE RESPONSIVE VALVE

Robert E. Raymond, Zanesville, Ohio, assignor to Racine Hydraulics and Machinery, Inc., a corporation of Wisconsin Filed Apr. 21, 1958, Ser. No. 730,015

8 Claims. (Cl. 137—471)

This invention relates to a valve and more particularly to a pressure responsive valve.

An object of this invention is to provide a new and improved valve which can handle large capacities of fluid at very high pressures and is substantially chatter free.

Another object of the invention is to provide a pressure responsive valve mechanism having a casing with a fluid inlet, a valve seat at an end of a flow passage in the casing, a movable valve member engageable with said seat to close the flow passage, means for yieldably urging the valve member onto the seat, and means providing a damping action on the valve member in a direction longitudinally of its movement including a flow restricting orifice between the fluid inlet and valve seat which also blocks pressure pulsations in the fluid from the valve member.

A further object of the invention is to provide a valve mechanism, as defined in the preceding paragraph, in which a chamber is located within the casing between the orifice and the valve seat, and having a piston member slidably mounted in said chamber and engageable with said valve member to further increase said damping action, and a flow restricting orifice in said piston placing opposite ends of the chamber in fluid communication.

Still another object of this invention is to provide a relief valve having a casing with a bore, a fluid inlet, a circular valve seat formed at the end of a flow passage, a ball valve member engageable with said valve seat and movable to close the flow passage, a guide member slidable in said bore and yieldably urged into engagement with said valve member tending to move the valve member onto its seat, a damping orifice of a size to block out out pulsations in the fluid from the valve member fixed between the fluid inlet and valve seat, a chamber in the casing between the orifice and the valve seat adjacent said flow passage, a piston member slidable in said chamber and in engagement with said valve member, and a flow restricting orifice in said piston placing opposite ends of the chamber in fluid communication.

A further object of the invention is to provide a relief valve as defined in the preceding paragraph wherein the guide member has a partially spherical concave lower end engageable with the valve member and the piston member has a part thereof formed with a partially spherical concave surface whereby said concave surfaces continually support the ball valve member to stabilize the motion thereof transversely to the direction of valve member movement and the piston transfers force resulting from the valve flow to the yieldably urged guide member to transfer a pressure rise to the guide member and render the relief valve self-compensating, the piston member also functioning to provide a dash pot action when the valve member is moved toward its seat.

Further objects and advantages will become apparent from the following detailed description taken in connection with the accompanying drawings in which.

Figure 1:
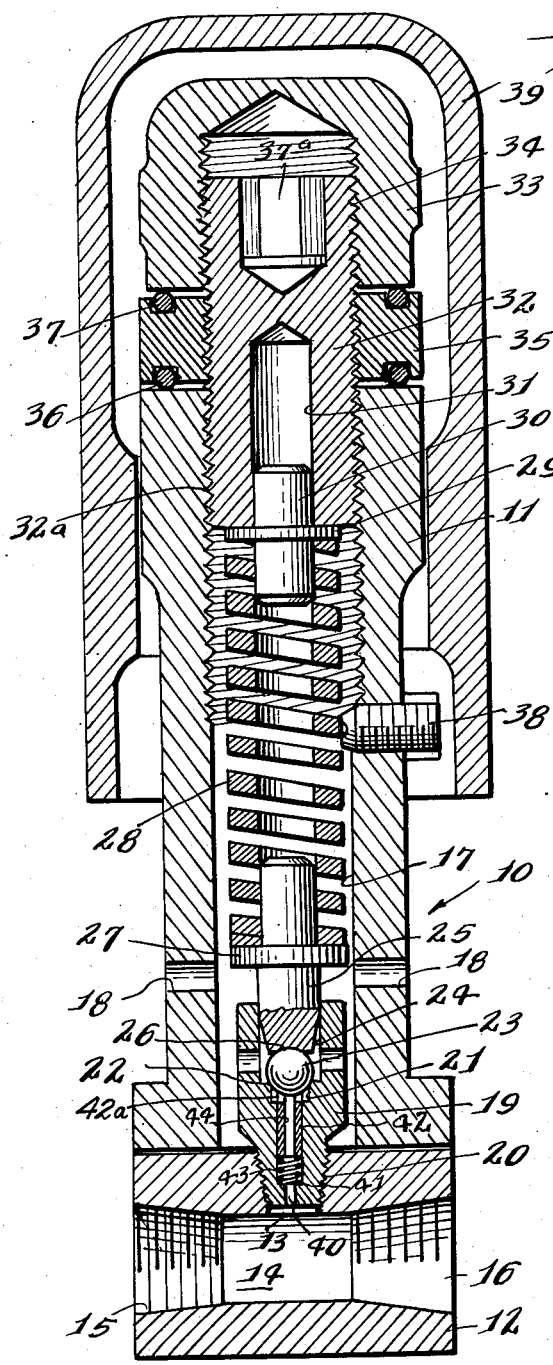
Fig. 1 is a vertical section taken through the center of a relief valve.

While this invention is susceptible of embodiment in many different forms, there is shown in the drawings and will herein be described in detail a preferred embodiment of the invention together with a modification with the understanding that the present disclosure is to be considered as an exemplification of the principles of the invention and is not intended to limit the invention to the embodiments illustrated. The scope of the invention will be pointed out in the appended claims.

In the preferred embodiment of the invention shown in Fig. 1, a relief valve indicated generally at 10 has a casing including a body 11 and a valve base 12. The casing base has a fluid inlet 13 which communicates with a passage 14 having openings 15 and 16 at opposite ends thereof for connection to a fluid line. The casing body 11 has an internal bore 17 communicating with externally opening passages 18. A casing insert 19 within the bore 17 is threadably fastened to the valve base 12 as indicated at 20.

The casing insert 19 is provided with a flow passage 21 having a circular valve seat formed by an end of the flow passage. A ball valve member 23 is movably mounted within a bore 24 formed in the casing insert 19 and is arranged to tightly seat upon the valve seat 22 and fully close the flow passage 21. A guide member 25 is located within the casing bore 17 and has its lower end extended within the insert bore 24 and formed with a partially spherical concave surface 26 to engage the upper side of the ball valve member 23. The guide 25 has a flange 27 intermediate its ends whereby a spring 28 extending within the bore 17 may have one end abutting against the flange and receiving the upper end of the guide member 25 while the opposite end of the spring 28 abuts against a flange 29 of a pin 30 fitted within an opening 31 of an externally threaded adjusting screw 32. The adjusting screw is threadably mounted in the casing body 11 as indicated at 32a for adjustment longitudinally of the casing body. The adjusting screw 32 is in threaded engagement with a cap 33 surrounding the upper end of the adjusting screw, as indicated at 34. A lock nut 35 surrounds the adjusting screw 32 at a location beneath the cap 33 and has sealing O-rings 36 and 37 on its opposite faces which engage with adjacent faces of the casing body 11 and the cap 33. The upper end of the adjusting screw 32 has a tool receiving socket 37a for rotating the adjusting screw to shift it longitudinally in the casing bore 17 to vary the force exerted by the spring 28 upon the ball valve member 26 tending to close said valve member against said valve seat 22. Removal of the cap 33 uncovers the tool receiving socket 37a.

A dampener screw 38 is threadably mounted in the casing body 11 and is engageable with the spring 28 to dampen the movement of the spring. A valve hood 39 surrounds and encloses the upper end of the relief valve mechanism.

The casing insert 10 has a flow restricting orifice 40 at its lower end located between the fluid inlet 13 and the valve seat 22 to block pressure pulsations in the fluid from the valve member 23. A chamber 41 is formed in the casing insert 19 and in communicating relation with the flow passage 21. A piston member 42 is slidably mounted in the chamber 41 and is resiliently urged into contact with the valve member 23 by a small spring 43 located in the lower end of the chamber 41. The spring may be omitted since when flow commences the viscous drag will move the piston into engagement with the valve member 23. The upper end of the piston member is partially spherically concave so as to have its upper end fully engage the underside of the ball valve member 23. The piston 42 has its upper end notched, as at 42a, to permit flow past the valve member.

Although not limiting the invention disclosed herein, in an actual embodiment of the valve mechanism the valve seat 22 has a seat diameter of 0.234 inch while the piston 42 has a diameter of 0.186 inch. The flow restricting orifice 40 has a diameter of 0.113 inch and the piston 42 has a flow restricting orifice 44 of the same diameter as the orifice 40. The orifice 44 places opposite ends of the chamber 41 in fluid communication with each other.

With the structure as disclosed in the embodiment of Fig. 1, the fixed orifice 40 creates a damping action on the valve member 23 in a direction longitudinally of valve member movement by a dash potting action since there is cushioning of the valve member 23 as it approaches its seat 22 due to the restriction of reverse flow through the main orifice 40. This action is facilitated by the piston 42 within the chamber 41 since as the valve member 23 moves downwardly toward its seat the piston member 42 must also move and this requires the piston to squeeze fluid out from chamber 41 through orifice 40. With the valve upright this constitutes a "vertical" damping action. The ball valve member 23 is perfectly free to find its own seat for the best seal because of the spherically concave engagement of the piston 42 and the guide 25 with the valve member and the relatively light action of the spring 43 urging the piston member 42 upwardly.

The orifice 40 also blocks or filters out pulsations from the valve member by functioning as a resistance and causing the capacity of the hydraulic system in which the valve is connected to absorb the high frequency pulsations. The orifice 44 in the piston member 42 further contributes to the rejection of high frequency pulsations in the fluid affecting the valve member 23.

The support of the valve member by the spherically concave surfaces when in an open position off the valve seat 22 results in a damping action of the valve member transversely to the direction of valve member movement and holds the valve member so that it is in position to control the flow passage 21. With the valve upright this constitutes a "horizontal" damping action.

The piston 42 transfers force resulting from flow through the valve to the main spring 28 thereby reducing the pressure rise due to the main orifice 40 and resulting in a flat pressure-flow curve. The piston in effect acts as a flow compensator.

Figure 2:
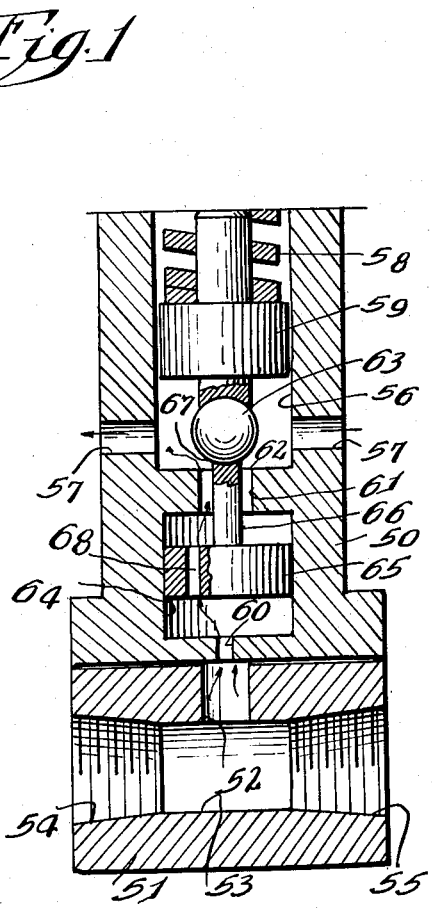
Fig. 2 is a fragmentary vertical section of a second embodiment of the relief valve taken through the center thereof.

In the embodiment of Fig. 2, the casing body 50 has a valve base 51 and a fluid inlet 52 communicates with a passage 53 in the valve base having openings 54 and 55 to connect to a fluid line. The casing body 50 is provided with a bore 56 having fluid outlets 57 and receives a spring 58 and a guide 59 corresponding to spring 28 and guide 25 respectively in the embodiment of Fig. 1. The adjusting mechanism for the spring 58 and other structure associated with the casing body 50 may be similar to that disclosed in Fig. 1.

The casing body 50 has a flow restricting orifice 60 located between the inlet 52 and a flow passage 61. The flow passage 61 has a circular valve seat 62 formed at an end thereof upon which a ball valve member 63 may seat.

A chamber 64 is formed in the casing body 50 and slidably receives a piston member 65 having a stem 66 extending from the upper side thereof with an upper end 67 partially spherically concave to engage against the underside of the ball valve member 63. A flow restricting orifice 68 extends through the piston member 65 to place opposite ends of the chamber 64 in fluid communication with each other.

The results attributed to the valve in the embodiment of Fig. 1 are also present in the embodiment of Fig. 2.

Further, the chamber 64 and piston member 65 have a diameter greater than that of the valve seat 62 to further contribute to the self-compensating effect of the valve wherein the piston transfers the force resulting from flow through the valve to the valve spring 58 thereby reducing the pressure rise due to the flow restricting orifice 60.

I claim:

1. In a relief valve for association with a hydraulic system, a casing having a fluid inlet and a fluid outlet in fluid relief communication by fluid connections including a casing bore and a flow passage intermediate the inlet and outlet, a circular valve seat formed at the outlet end of the flow passage and upsteam of the bore, a movable ball valve member tightly engageable with said valve seat to close the flow passage, a guide member movable in said bore and having a partially spherical concave end engageable with the valve member for lateral guiding thereof, a spring engageable with the guide member for urging the guide member and valve member toward the valve seat, a flow restricting orifice located between the fluid inlet and valve seat to block out pulsations in the fluid from the valve member and utilize the cushioning effect of the fluid system, a chamber in said casing in the fluid path between the orifice and the valve seat and adjacent said flow passage, and a piston member movable in said chamber and having a flow restricting orifice placing opposite ends of the chamber in fluid communication to lessen the effect of fluid pulsations in the system on the valve member, said piston member having a part extending through said passage with a partially spherical concave end in engagement with said valve member for movement with the valve member to coact with the guide member in guiding the valve member.

2. In a pressure responsive hydraulic valve, a casing, a fluid inlet and a fluid outlet, a valve seat formed at the end of a flow passage, a valve member engageable with said valve seat, a spring operatively associated with the valve member for urging the valve member toward the valve seat, a damping orifice of a size to block out pulsations in the fluid from the valve member fixed between the fluid inlet and valve seat, a chamber in said casing between the orifice and the valve seat adjacent said flow passage, a piston member movable in said chamber and having a part extending through said passage into engagement with said valve member, and a passage in said piston placing opposite ends of the chamber in fluid communication with the flow passage and fluid inlet whereby fluid pressure is transmitted through the damping orifice and piston passage before reaching the valve member.

3. In a hydraulic relief valve, a casing having a bore, a fluid inlet, a flow passage intermediate the inlet and outlet, a circular valve seat formed at the outlet end of the flow passage, a ball valve member tightly engageable with said valve seat, a guide member movable in said bore and having a partially spherical concave end engageable with the valve member, means engageable with the guide member for urging the guide member and valve member toward the valve seat, a damping orifice of a size to block out pulsations in the fluid from the valve member located between the fluid inlet and valve seat, a chamber in said casing in the fluid path between the orifice and the valve seat adjacent said flow passage and having a diameter greater than the valve seat, a piston member movable in said chamber and having a part extending through said passage with a partially spherical concave end in engagement with said valve member, and a passage in said piston placing opposite ends of the chamber in fluid communication.

4. A hydraulic relief valve comprising, a casing having a fluid inlet and a flow passage, a valve seat formed by an end of the flow passage, a ball valve member engageable with said seat, means for urging the valve member against its seat, a chamber in the fluid path between said inlet and valve seat having a diameter greater than that of the valve seat, a damping orifice between said chamber and inlet, a piston closely slidable in said chamber and having a stem engageable with said valve member, and a damping orifice in said piston.

5. A hydraulic relief valve comprising, a casing having a fluid inlet and a flow passage, a valve seat at an end of the flow passage, a valve member engageable with said seat to close the flow passage, means for resiliently urging the valve member against its seat, a chamber in the fluid path between said inlet and valve seat having a diameter greater than that of the valve seat, a piston closely slidable in said chamber and having a stem engageable with said valve member in all positions of the valve member, and a flow restricting passage in said piston placing opposite ends of the chamber in fluid communication.

6. A hydraulic valve mechanism comprising, a casing having an inlet, a valve seat, a valve member engageable with said seat, means defining a damping orifice between the inlet and the valve seat, means defining a chamber in the fluid path between the orifice and the valve seat, a piston member movably mounted in said chamber and engageable with said valve member for movement with the valve member, and a flow passage between opposite sides of said piston.

7. A pressure responsive hydraulic valve comprising, a casing having a fluid inlet, a fluid outlet, and a flow passage, a valve seat formed by the end of the flow passage, a ball valve member engageable with said seat, means for resiliently urging the valve member against its seat, and means for subjecting the valve member to inlet fluid pressure comprising in addition to said flow passage a chamber between said inlet and valve seat, a flow restricting orifice between said chamber and inlet, a piston movable in said chamber and engageable with said valve member for movement therewith, and a flow restricting orifice in said piston.

8. A relief valve comprising, a casing having a fluid inlet, a fluid outlet, and a flow passage, a valve seat, a valve member engageable with said seat to close the flow passage, means for resiliently urging the valve member against its seat, and means for subjecting the valve member to fluid pressure without substantial pressure pulsations including in addition to said flow passage a chamber between said inlet and valve seat, a damping orifice between said chamber and inlet, a piston movable in said chamber and engageable with said valve member, and a damping orifice in said piston.

References Cited in the file of this patent

UNITED STATES PATENTS

| | | |
|---|---|---|
| 1,815,533 | Vincent | July 21, 1931 |
| 2,322,139 | Kaelin | June 15, 1943 |
| 2,646,066 | Nemetz | July 21, 1953 |
| 2,682,890 | May | July 6, 1954 |

FOREIGN PATENTS

| | | |
|---|---|---|
| 251,978 | Switzerland | Sept. 1, 1948 |
| 706,648 | Great Britain | Mar. 31, 1954 |
| 723,375 | Great Britain | Feb. 9, 1955 |